(No Model.)
R. RASMUSSEN.
SAW SET AND CLAMP.
No. 474,460. Patented May 10, 1892.
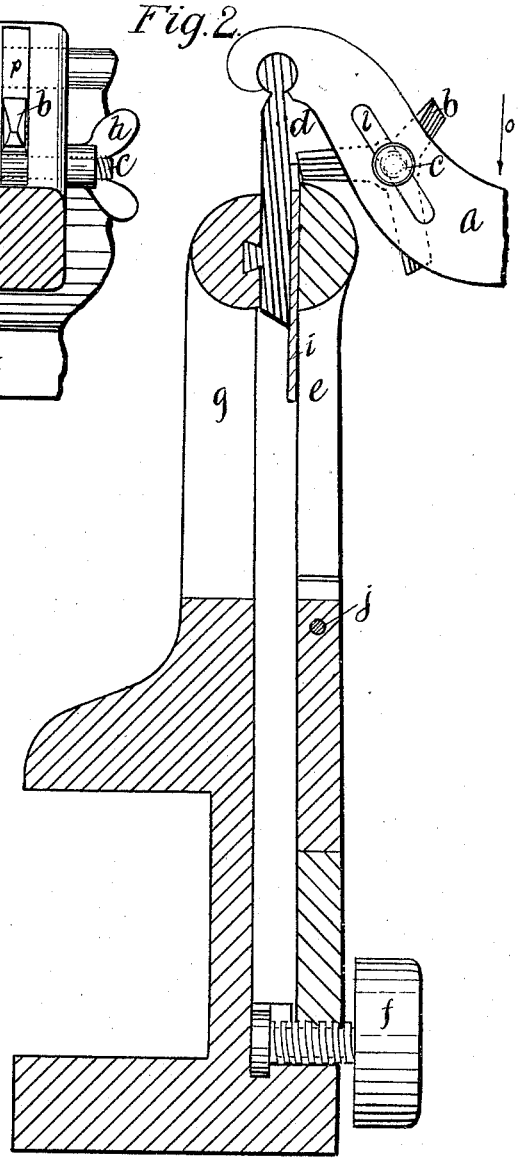
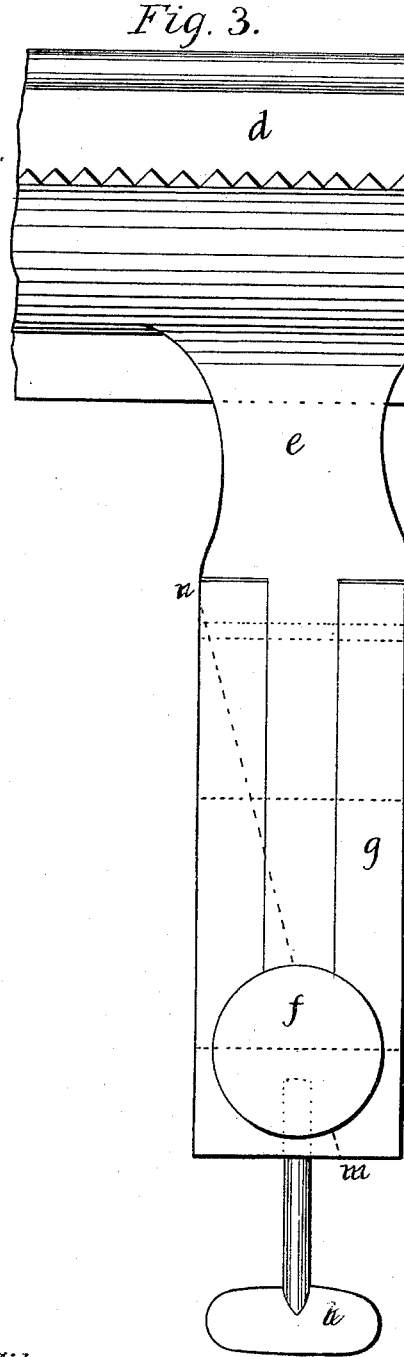
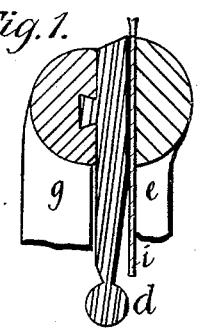
Witnesses
Inventor
Rasmus Rasmussen

UNITED STATES PATENT OFFICE.

RASMUS RASMUSSEN, OF TACOMA, WASHINGTON.

SAW SET AND CLAMP.

SPECIFICATION forming part of Letters Patent No. 474,460, dated May 10, 1892.

Application filed March 25, 1891. Serial No. 386,385. (No model.)

*To all whom it may concern:*

Be it known that I, RASMUS RASMUSSEN, a citizen of the United States, residing at Tacoma, in the county of Pierce and State of Washington, have invented a new Combination Saw Set and Clamp, of which the following is a specification.

My invention relates to improvements in a machine to hold and set evenly to any degree saws with straight lines of teeth. In this machine a slide $d$ is used as a fulcrum for a lever attachment $a$ in setting, and by reversing is made to assist in holding the saw in filing. I attain these objects by the mechanism illustrated in the accompanying drawings, in which—

Figure 3 is a front elevation of the machine. Fig. 2 is a partial sectional view and side elevation, the lower part being a section on the line $m\ n$ in Fig. 3, Fig. 1 being a section of the jaws of the clamp with saw in position for filing.

Similar letters refer to similar parts throughout the several views.

A clamp-screw $k$ holds the machine to a table, the edge of which may pass in the slot for that purpose, or the entire machine may be placed on top of the table and the clamp-screw $k$ pass through the table. In this manner the machine may be made to swing either way, so as to obtain more favorable light for work.

Figs. 2 and 3 show the machine with a saw $i$ in position for setting. The length of the jaws $g\ e$ in Fig. 3 is abbreviated. They should be from one to two feet in length.

Fig. 1 shows the jaws $g\ e$ clasping a saw $i$ in position for filing. The slide $d$ is so constructed that it may be reversed and used for holding the saw to file.

In adjusting a saw for setting, the thumb-screw $f$ is loosened, and by this means the jaws $g\ e$ of the machine are allowed to open, allowing the saw $i$ to come between them. The saw $i$ is adjusted so that the portion of the tooth to be bent must come above the point where the bevel in the slide intersects the plane surface. The lever attachment $a$ is allowed to slide freely on the round lip at the top of the slide $d$. The three-armed button $b$, by loosening the nut $h$, may be turned on the bolt $c$. In adjusting the button $b$ the bolt $c$ may be moved in the slot $l$, so that the button $b$ may be given the proper adjustment. The button $b$ is allowed to turn in the slot $p$.

The process of setting the saw $i$ consists of sliding the lever attachment $a$ so that the arm of the button comes over the tooth to set, and then pressing down with the hand on the lever $a$ in the direction indicated by the arrow-head $o$. The beveled surface on the side of the slide $d$ determines the uniformity of the set, and the amount of set depends upon the length of tooth bent. The lever $a$, which in the drawings is abbreviated, should be about eight inches in length.

What I do claim as my invention is—

The herein-described saw setting and clamping device, consisting of the jaws $g\ e$, the bar $d$, attached to one of the jaws and reversible lever $a$, and the setting jaw or button $b$, secured to said lever and adjustable, as shown.

RASMUS RASMUSSEN.

Witnesses:
 ADDISON R. SAUNDERS,
 IRVING M. CLARK.